United States Patent
Becker et al.

(10) Patent No.: US 6,746,232 B2
(45) Date of Patent: Jun. 8, 2004

(54) MOLD MOUNTING PLATE FOR AN INJECTION MOLDING MACHINE

(75) Inventors: Klaus Becker, Wetter (DE); Guido Legewie, Herne (DE)

(73) Assignee: Mannesmann Plastics Machinery GmbH, Munich (DE)

( * ) Notice: Subject to any disclaimer, the term of this patent is extended or adjusted under 35 U.S.C. 154(b) by 8 days.

(21) Appl. No.: 10/179,422

(22) Filed: Jun. 25, 2002

(65) Prior Publication Data

US 2003/0008030 A1 Jan. 9, 2003

(30) Foreign Application Priority Data

Jul. 6, 2001 (DE) .......................... 101 32 970

(51) Int. Cl.⁷ ............................... B29C 45/66
(52) U.S. Cl. .................... 425/589; 425/450.1; 425/595; 100/258 A
(58) Field of Search ................. 425/589, 595, 425/406, 450.1; 100/258 A

(56) References Cited

U.S. PATENT DOCUMENTS

| | | | | |
|---|---|---|---|---|
| 5,328,346 A | * | 7/1994 | Kodric | .................. 100/258 A |
| 5,593,711 A | * | 1/1997 | Glaesener | .................... 425/595 |
| 5,776,402 A | * | 7/1998 | Glaesener | .................... 425/589 |
| 6,027,329 A | | 2/2000 | Nazarian et al. | |
| 6,379,145 B1 | * | 4/2002 | Urbanek | ...................... 425/589 |
| 6,575,732 B2 | * | 6/2003 | Kappelmuller | .............. 425/595 |

FOREIGN PATENT DOCUMENTS

| | | |
|---|---|---|
| DE | 198 55 663 A1 | 6/1999 |
| EP | 0 381 107 B1 | 6/1994 |
| EP | 0 789 648 B1 | 4/1998 |
| JP | 62111710 | 5/1987 |
| JP | 08267463 | 10/1998 |

* cited by examiner

Primary Examiner—Tim Heitbrink
(74) Attorney, Agent, or Firm—Henry M. Feiereisen

(57) ABSTRACT

A mold mounting plate for an injection molding machine for processing material, in particular plastic material, includes a main body having a plate-shaped central portion. Received in the main body are plural sleeves which define openings for support of column-like holding and/or guiding elements of the injection molding machine, and are secured to the central portion such as to establish a flexible bending/torsion joint. In this way, a transmission of moments onto the column-like holding and/or guiding elements as a result of a deformation of the mold mounting plate is minimized.

13 Claims, 2 Drawing Sheets

MOLD MOUNTING PLATE FOR AN INJECTION MOLDING MACHINE

CROSS-REFERENCES TO RELATED APPLICATIONS

This application claims the priority of German Patent Application Serial No. 101 32 970.9, filed Jul. 6, 2001, pursuant to 35 U.S.C. 119(a)–(d), the subject matter of which is incorporated herein by reference.

BACKGROUND OF THE INVENTION

The present invention relates, in general, to a mold mounting plate for an injection molding machine.

U.S. Pat. No. 5,593,711 describes a mold mounting plate for support of a mold of a plastics injection molding machine. The mold mounting plate includes a base plate, a frustoconical center portion, and a front plate in parallel relationship to the base plate. The base plate has corner regions provided with bores for receiving four tie bars of the injection molding machine. The center portion is configured as hollow body and has a base for attachment to a central location of the base plate. The blunted tip of the central portion is attached to the front plate for the mold. Thus, the front plate is supported solely in its central area by the center portion. In this way, the front plate of the mold mounting plate is intended to remain flat, even when subjected to the clamping force of the injection molding machine, to thereby prevent a deflection and resultant opening of the mold halves.

European Pat. No. EP 0 789 648 B1 discloses an injection molding machine having a substantially C-shaped machine frame having two limbs, which are not connected by tie bars. Mounted to one of the limbs is a fixed mold mounting plate, whereas a flange of a closing unit is secured to the other limb. The closing unit essentially includes a hydraulic piston and cylinder unit to shift the moveable mold mounting plate, which is displaceably supported on the machine frame. The flange and the fixed mold mounting plate are each secured by holding members to the limbs of the machine frame. During closing operation, the holding members of the flange are subject to tensile stress and the fixed mold mounting plate is subject to pressure. The holding members are functionally equivalents to springs and have an elasticity, which is smaller than the elasticity of the machine frame. Several holding members may be provided in spaced-apart disposition over the height of the fixed mold mounting plate and the flange and exhibit different elasticity, whereby the lower holding members have a greater elasticity than the upper holding members. The holding members are made of spring steel and weakened through provision of slots. Their lower portion has slots of different depth to enhance the elasticity. When the limbs of the machine frame are pushed apart in the upper zone during injection operation, the fixed mold mounting plate and the flange can tilt relative to the machine frame to maintain the mold mounting plates in parallel relationship. The holding members thus form an axleless joint to allow rotational motions as well as translational motions.

European Pat. No. EP 0 381 107 B1 discloses a closing unit for a horizontal two-platen injection molding machine for processing plastic material. The injection molding machine includes a fixed mold mounting plate and a moveable mold mounting plate in confronting disposition to support respective mold halves of the mold. The fixed mold mounting plate has a substantially rectangular configuration and is connected with the moveable mold mounting plate by four spindles positioned in the corners of an imaginary tetragon. The spindles are non-rotatably arranged and cantilevered on the fixed mold mounting plate. In order to close and open the mold, the moveable mold mounting plate can be moved in a direction to and away from the fixed mold mounting plate by the spindles, as it travels along the spindles. The drive for the moveable mold mounting plate is implemented by mounting on the side, facing away from the clamping surface for the mold, a spindle nut for each of the spindles, whereby all the spindle nuts rotate together in synchronism by a drive, e.g., electric motor. The spindle nuts are each constructed as ball nut. After closing the mold, the clamping force is applied on the mold halves by an additional hydraulic piston and cylinder unit, which acts on the spindle nuts. The piston and cylinder unit has an annular piston through which the respective spindle is guided. In order to allow opening of the mold halves after the injection molding process, the piston and cylinder unit is constructed as a double-action piston and cylinder unit.

When the mold mounting plates distorts or deforms, these deformations are transmitted to the spindles guided in the openings of the mold mounting plate, resulting in undesired bending stress of the spindles so that the parallelism between the spindles and between the spindles and the axis of the injection molding machine is no longer maintained. As a consequence, the spindles and/or the spindle drives are exposed to increased wear, reducing service life and leading ultimately to their destruction.

It would therefore be desirable and advantageous to provide an improved mold mounting plate of an injection molding machine to obviate prior art shortcomings and to minimize in a simple manner a transmission of moments onto column-like holding and/or guiding elements of the injection molding machine as a result of a deformation of the mold mounting plate.

SUMMARY OF THE INVENTION

According to one aspect of the present invention, a mold mounting plate for an injection molding machine for processing material, in particular plastic material, includes a main body having a plate-shaped central portion, plural sleeves received in the main body and defining openings for support of column-like holding and/or guiding elements of the injection molding machine, and a connection assembly for securing the sleeves to the central portion such as to establish a flexible bending/torsion joint.

The present invention resolves prior art problems by providing an elastic securement for a connection of the mold mounting plate to the holding and/or guiding elements through dividing the mold mounting plate into a rigid central portion and sleeves, which are supported elastically in the central portion. Suitably, the central portion and the sleeves are made of single-piece configuration, preferably a single-piece structure of cast steel.

According to another feature of the present invention, the central portion of the main body may have a substantially rectangular configuration and defines corner regions for arrangement of the sleeves in one-to-one correspondence, wherein the connection assembly may include in each of the corner regions a pair of legs, arranged in spaced apart relationship to define a U-shaped area and extending outwards, and a bolt arranged between the legs and provided for attachment of the sleeve. Upon application of a clamping force, the legs and the bolts are subjected to torsion and bending. Suitably, the sleeve is secured in midsection of the bolt at its side confronting the center portion. In order to enlarge the contact area between the sleeve and the bolt, the sleeve dips into the bolt, i.e. the sleeve is partly received in the bolt.

According to another feature of the present invention, the central portion may include an inner rib structure having opposite sides, and cover plates, one cover plate covering one side of the rib structure, and the other cover plate covering the other side of the rib structure, wherein the rib structure includes a central annulus, Y-shaped connecting ribs having one end secured to the annulus and being spaced from one another in a star-shaped manner, and peripheral ribs connected to another end of the Y-shaped connecting ribs. Thus, as the mold mounting plate is subjected to the clamping force, the cover plates are no longer required to absorb loads in the area of the flexible joint and thus, there is no need to extend the cover plates beyond the central portion, so that the weight of the mold mounting plate can be reduced.

Through configuration of the mold mounting plate with the rib structure, the stiffness of the mold mounting plate can be suited to the situation at hand by changing the vertical extension and position of the rib structure, so that a self-flexure of the mold mounting plate is minimized during the injection molding process.

A mold mounting plate according to the present invention is suitable for use in plastics injection molding machine without tie bars, whereby the mold mounting plates are connected hereby to the, normally U-shaped, machine frame by holding and/or guiding elements received in the openings of the sleeves. This support of the mold mounting plates without axle joint maintains the parallelism of the mold mounting plates, when the legs of the U-shaped machine frame yield as a result of the clamping force. Of course, a mold mounting plate according to the present invention is also suitable for use in so-called three-platen injection molding machines.

According to another feature of the present invention, the bolt may be arranged in eccentric relationship to the sleeve. Suitably, the sleeve defines a longitudinal axis, which is oriented at a right angle to the surface of the central portion, and the bolt defines a longitudinal axis, which is oriented at a right angle to the surface of the central portion and extends at a right angle to the longitudinal axis of the sleeve.

According to another feature of the present invention, the sleeve may be separated from the central portion by a gap on its outer surface facing the central portion. Suitably, the gap has a sickle-shaped configuration.

According to another feature of the present invention, the legs may be respectively connected to the bolt via rounded transitions, and the bolt is connected to the sleeve via a rounded transition. In this way, the sleeve, the bolt and the legs can be connected together in a notch-friendly manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
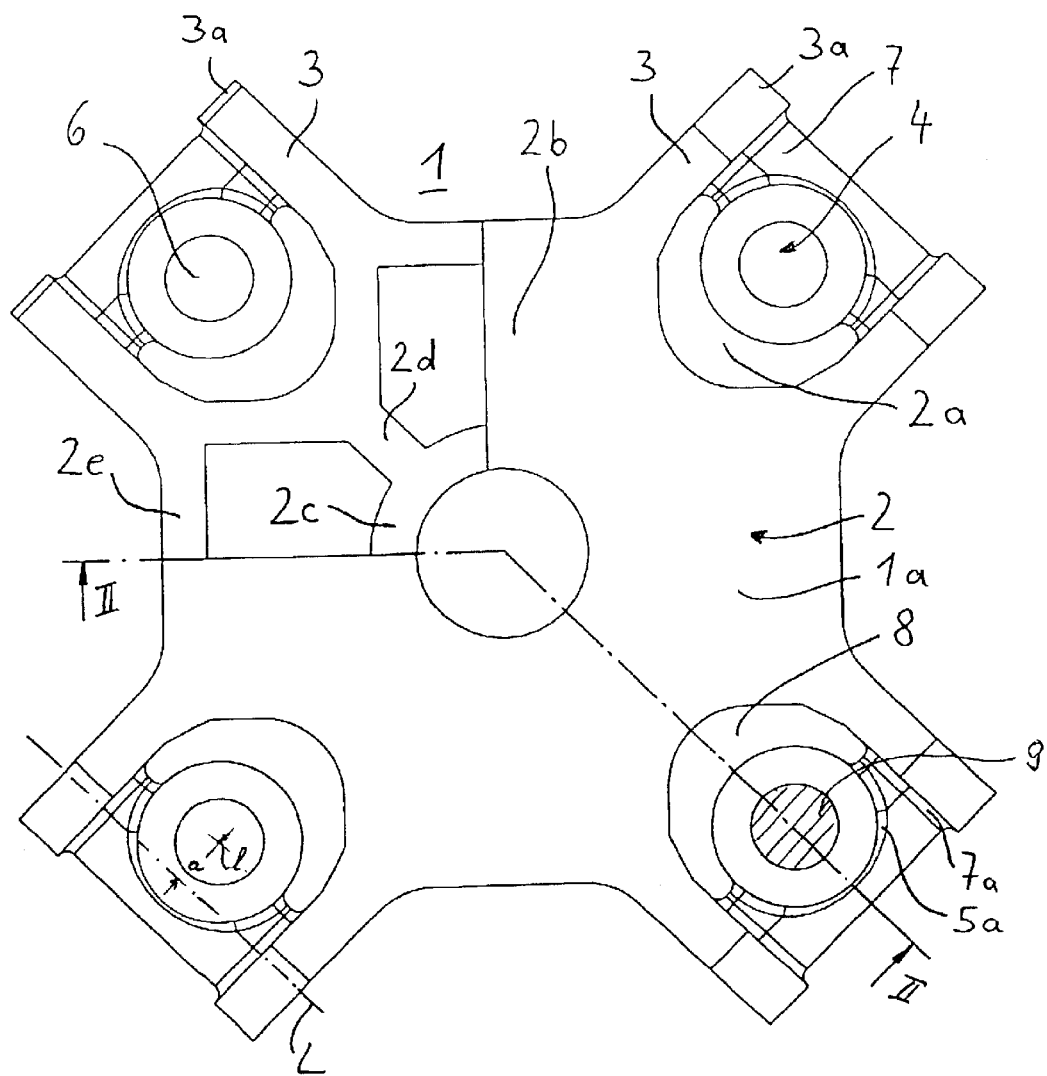
FIG. 1 is a front elevational view of a mold mounting plate according to the present invention, partly broken to show the inner support structure.

Throughout all the Figures, same or corresponding elements are generally indicated by same reference numerals.

Turning now to the drawing, and in particular to FIG. 1, there is shown a front elevational view of a mold mounting plate according to the present invention, generally designated by reference numeral 1 for use in an injection molding machine, partly broken to show the inner support structure. For the sake of simplicity, the injection molding machine will be described hereinafter only in connection with those parts that are necessary for the understanding of the present invention. In general, an injection molding machine, involved here may be a two-platen injection molding machine for plastics and includes a machine frame, a fixed mold mounting plate mounted to the machine frame, and a movable mold mounting plate. The plates are provided with a closing unit, having several spindle drives with spindles, for opening and closing operations, whereby the spindles extend in the direction of the moveable mold mounting plate and through the corner regions of the moveable mold mounting plate as well as attached spindle nuts. These spindle nuts are caused to rotate by a drive to open and close molds secured to the mold mounting plates. Suitably, the spindle drives are ball screws. Operation and structure of such injection molding machines are generally known to the artisan and not further described in more detail. Injection molding machine without tie bars utilize column-like holding and/or guiding elements to secure the mold mounting plates to the machine frame.

The mold mounting plate 1, which may be a fixed mold mounting plate or a movable mold mounting plate, includes a main body having a substantially rectangular central portion 2 which connects in its corner regions 2a into two flat legs 3 arranged in U-shaped relationship. The legs 3 terminate in free ends 3a, which face away from the central portion 2. The legs 3 and each corner region 2a of the center portion 2 define a generally U-shaped zone 4, which is open to the outside, i.e. away from the central portion 2.

Disposed in each of the four U-shaped zones 4 is a sleeve 5 which has a through opening 6 for receiving the column-like holding and/or guiding elements 9 of the injection molding machine, shown here by way of example at one sleeve 5. As the U-shaped zones 4 are of identical construction, it will be understood by persons skilled in the art that a description of one U-shaped zone 4 is equally applicable to the other U-shaped zones 4. The sleeve 5 in the U-shaped zone 4 defines a longitudinal axis I (FIG. 2), which extends at a right angle to the surface 1a of the main body of the mold mounting plate 1. In midsection thereof, the sleeve 5 is connected to a bolt 7 for securement to opposite free ends 3a of the legs 3. The bolt 7 is suitably designed as solid cylinder and is defined by a longitudinal axis L, which extends at a right angle to the surface 1a of the main body of the mold mounting plate 1 and at a right angle to the longitudinal axis I of the sleeve 5. The sleeve 5 is also arranged eccentrically to the bolt 7, i.e. the longitudinal axes L and I extend in lateral spaced-apart disposition, as indicated in FIG. 1 by reference character "a".

The bolt 7 abuts with its opposite axial ends the confronting inner sides of the legs 3. In order to realize a large-area connection between the sleeve 5 and the bolt 7, the sleeve 5 is received in an arcuate recess of the bolt 7. Suitably, the sleeve 5 dips into the bolt 7 by about up to ⅔ of its thickness and thus by about half its diameter. The transition 5a between the sleeve 5 and the bolt 7 and the transitions 7a between the free ends of the legs 3 and the bolt 7 are configured in a notch-friendly manner as radii. As a consequence of this type of connection between the sleeve 5 and the center portion 2, the sleeve 5 is separated in the area of its side confronting the center portion 2 by a gap 8, which has a generally sickle-shaped configuration and extends about 180° with respect to the center of the sleeve 5. The gap 8 is bounded at its ends by the bolt 7.

Due to the configuration of the webs 3 and the type of suspension of the sleeve 5 via the bolt 7, the sleeve 5 juts out beyond the imaginary rectangular contour of the center portion 2 by about a quarter of its diameter.

The legs 3 and the bolt 7 form an elastically yielding connection of the sleeve 5 with the center portion 2, so that deflections of the mold mounting plate 1 as a result of an applied clamping force is transmitted to the sleeve 5 to a lesser extent. The legs 3 and the bolt 7 are subjected to torsion and bending. The elasticity of the legs 3 and the bolt 7 is so selected that, under impact of the column-like holding and/or guiding elements of the injection molding machine and the load on the mold side of the mold mounting plate 1, not only the holding and/or guiding elements remain in parallel relationship but the center portion 2 of the mold mounting plate 1 remain also essentially flat. Thus, the holding and/or guiding elements will hardly be subject to bending forces.

As is further shown in FIG. 1, the center portion 2 of the mold mounting plate 1 is designed in lightweight construction with upper and lower cover plates 2b and a rib structure positioned between the cover plates 2b. As viewed in top plan view, the rib structure includes a central annulus 2c, Y-shaped connecting ribs 2d and peripheral ribs 2e. The four connecting ribs 2d are evenly spaced about the circumference of the annulus 2c in a star-like manner and connected to the annulus 2c with one end. The other fork-shaped ends of the Y-shaped connecting ribs 2d are connected to the peripheral ribs 2e arranged between the cover plates 2b in a marginal region thereof. Thus, the center portion 2 has a tetragonal outer contour with retracted corner regions 2a in the area of the Y-shaped connecting ribs 2d. The legs 3 also connect into the junction zone between the Y-shaped connecting ribs 2d and the peripheral ribs 2e.

The configuration of the mold mounting plate 1 with the rib structure and the sleeves 5, connected to the rib structure via the legs 3 and the bolts 7, is in particular suitable for a single-piece design of the mold mounting plate 1 as a casting, preferably as cast steel member Thus, the mold mounting plate 1 may be made in an especially simple manner.

Figure 2:
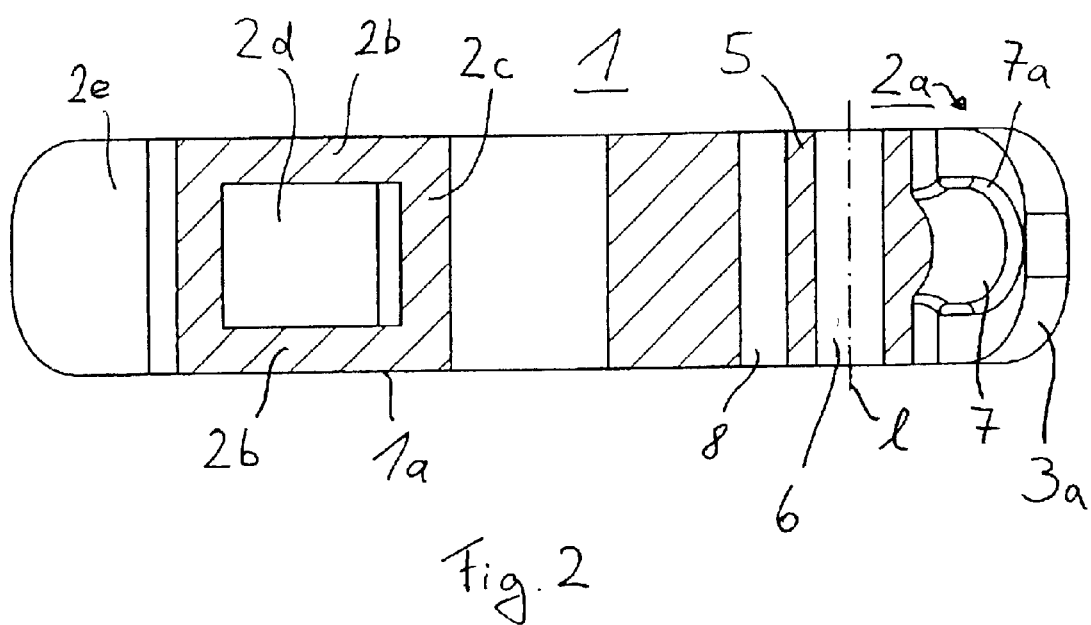
FIG. 2 is a side view of the mold mounting plate, taken along the line II—II in FIG. 1.

The rib structure of the mold mounting plate 1 can be clearly seen in FIG. 2, which is a side view of the mold mounting plate, taken along the line II—II in FIG. 1, including the perpendicular orientation of the longitudinal axis I of the sleeve 5 relative to the surface 1a of the center portion 2. Also clearly shown is the radius-like transition 7a between the bolt 7 and the leg 3.

While the invention has been illustrated and described as embodied in a mold mounting plate for an injection molding machine, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. A mold mounting plate for an injection molding machine for processing material, in particular plastic material, comprising:

a main body having a plate-shaped central portion;

plural sleeves received in the main body and defining openings for support of holding and/or guiding means of an injection molding machine; and connecting means for securing the sleeves to the central portion so as to establish a flexible bending/torsion joint.

2. The mold mounting plate of claim 1, wherein the central portion has a substantially rectangular configuration and defines corner regions for arrangement of the sleeves in one-to-one correspondence, said connecting means including in each of the corner regions a pair of legs, which are arranged in spaced apart relationship to define a U-shaped zone and extend outwards, and a bolt arranged between the legs and provided for attachment of the sleeve.

3. The mold mounting plate of claim 2, wherein the bolt is arranged in eccentric relationship to the sleeve.

4. The mold mounting plate of claim 2, wherein the central portion has a surface, wherein the sleeve defines a longitudinal axis, which is oriented at a right angle to the surface of the central portion, and the bolt defines a longitudinal axis, which is oriented at a right angle to the surface of the central portion and extends at a right angle to the longitudinal axis of the sleeve.

5. The mold mounting plate of claim 2, wherein the sleeve defines a longitudinal axis, and the bolt defines a longitudinal axis, wherein the longitudinal axis of the bolt is oriented at a right angle to the longitudinal axis of the sleeve and at a right angle to the legs.

6. The mold mounting plate of claim 2, wherein the bolt has opposite ends, one end secured to an inside of one of the legs, and the other end secured to an inside of the other one of the legs, wherein the sleeve is secured to the boll on its side facing the central portion.

7. The mold mounting plate of claim 6, wherein the sleeve dips into the bolt.

8. The mold mounting plate of claim 6, wherein the sleeve is separated from the central portion by a gap on its outer surface facing the central portion.

9. The mold mounting plate of claim 8, wherein the gap is a sickle-shaped through opening.

10. The mold mounting plate of claim 1, wherein the main body forms with the central portion and the sleeves a single-piece structure of cast steel.

11. The mold mounting plate of claim 2, wherein the legs are respectively connected to the bolt via rounded transitions, end the bolt is connected to the sleeve via a rounded transition.

12. The mold mounting plate of claim 1, wherein the central portion is comprised of an inner rib structure having opposite sides, and two cover plates, one of said cover plates placed over one side of the rib structure, and the other cover plate placed over the other side of the rib structure, wherein the rib structure includes a central annulus, Y-shaped connecting ribs having one end secured to the annulus and spaced from one another in a star-shaped manner, and peripheral ribs connected to another end of the Y-shaped connecting ribs.

13. The mold mounting plate of claim 1, wherein the holding and/or guiding means have a configuration in the form of a column.

* * * * *

UNITED STATES PATENT AND TRADEMARK OFFICE
CERTIFICATE OF CORRECTION

PATENT NO. : 6,746,232 B2
DATED : June 8, 2004
INVENTOR(S) : Klaus Becker and Guido Legewie It is certified that error appears in the above-identified patent and that said Letters Patent is hereby corrected as shown below:

Column 6,
Line 33, delete "boll" and insert -- bolt -- instead.

Signed and Sealed this

Twenty-first Day of December, 2004

JON W. DUDAS
*Director of the United States Patent and Trademark Office*